(12) United States Patent
Chauvin et al.

(10) Patent No.: US 11,267,184 B2
(45) Date of Patent: Mar. 8, 2022

(54) METHOD OF DELIVERING A LIQUID VOLUME AND ASSOCIATED APPARATUS

(71) Applicant: DISCMA AG, Zürich (CH)

(72) Inventors: Guillaume Chauvin, Duchess Manor (SG); Christophe Collin, Fuveau (FR); Damien Kannengiesser, Golbey (FR); Jean-Tristan Outreman, Septemes les Vallons (FR); Jean-Louis Pellegatta, Seillons Source d'Argens (FR)

(73) Assignee: Discma AG, Zürich (CH)

( * ) Notice: Subject to any disclaimer, the term of this patent is extended or adjusted under 35 U.S.C. 154(b) by 0 days.

(21) Appl. No.: 16/990,626

(22) Filed: Aug. 11, 2020

(65) Prior Publication Data
US 2020/0368959 A1    Nov. 26, 2020

Related U.S. Application Data

(62) Division of application No. 15/028,094, filed as application No. PCT/EP2014/071625 on Oct. 9, 2014, now Pat. No. 10,737,429.

(30) Foreign Application Priority Data

Oct. 10, 2013 (EP) .................................... 13188030

(51) Int. Cl.
*B29C 49/46* (2006.01)
*B29C 49/18* (2006.01)
(Continued)

(52) U.S. Cl.
CPC .............. *B29C 49/18* (2013.01); *B29C 49/28* (2013.01); *B29C 49/46* (2013.01); *B29D 22/003* (2013.01);
(Continued)

(58) Field of Classification Search
None
See application file for complete search history.

(56) References Cited

U.S. PATENT DOCUMENTS 6,230,547 B1    5/2001    Carroll, Jr.
8,573,964 B2   11/2013    Andison et al.
(Continued)

FOREIGN PATENT DOCUMENTS

DE    102011011076 A1 *  8/2012    ........... B29B 13/024
DE    102011011076 A1    8/2012

*Primary Examiner* — Monica A Huson
*Assistant Examiner* — Kelsey C Grace
(74) *Attorney, Agent, or Firm* — Eric J. Sosenko; Jonathan P. O'Brien; Honigman LLP

(57) ABSTRACT

An apparatus for forming a container from a preform and delivering a predetermined volume of a liquid end product, formed by the addition of first and second liquid products, into the container. The apparatus includes a heating oven to heat the preform, a mold defining a cavity in the shape of the container, a stretch member coupled to an actuator to stretch the preform in the mold, an injection head configured to inject the second liquid product through the mouth of the preform so as to cause expansion of the preform within the mold thereby obtaining the container, and a preform filler to at least partially fill the preform with the first liquid prior to injecting of the second liquid product and before expanding of the preform into the container.

19 Claims, 2 Drawing Sheets

(51) Int. Cl.
*B65B 3/02* (2006.01)
*B29C 49/28* (2006.01)
*B29D 22/00* (2006.01)
B29L 31/00 (2006.01)
B29C 49/06 (2006.01)
B29C 49/12 (2006.01)
B29C 49/58 (2006.01)

(52) U.S. Cl.
CPC ....... *B65B 3/022* (2013.01); *B29B 2911/1444* (2013.01); *B29B 2911/14333* (2013.01); *B29C 49/06* (2013.01); *B29C 49/12* (2013.01); *B29C 2049/465* (2013.01); *B29C 2049/4664* (2013.01); *B29C 2049/5858* (2013.01); *B29L 2031/7158* (2013.01); *B65B 2220/14* (2013.01)

(56) References Cited

U.S. PATENT DOCUMENTS

| | | | |
|---|---|---|---|
| 9,079,345 | B2 | 7/2015 | Chauvin et al. |
| 2001/0010145 | A1 | 8/2001 | Tawa et al. |
| 2006/0003098 | A1 | 1/2006 | Rashed et al. |
| 2012/0315350 | A1* | 12/2012 | Andison ............... B29C 49/46 425/524 |
| 2013/0122136 | A1* | 5/2013 | Fevre .................... B29C 49/58 425/535 |
| 2013/0147097 | A1 | 6/2013 | Lane et al. |

\* cited by examiner

METHOD OF DELIVERING A LIQUID VOLUME AND ASSOCIATED APPARATUS

CROSS-REFERENCE TO RELATED APPLICATIONS

This application is a divisional application of U.S. application Ser. No. 15/028,094, filed on Apr. 8, 2016, which is a U.S. national phase of PCT Application No. PCT/EP2014/071625, filed on Oct. 9, 2014, which claims priority to EP13188030.4 filed on Oct. 10, 2013, the disclosures of which are all herein incorporated by reference in their entirety.

FIELD OF THE INVENTION

The present invention relates to the field of manufacturing containers made of a polymer material, especially a polyester. More particularly, it relates to the field of manufacturing polyester bottles, preferably polyethylene terephthalate (PET) bottles containing a liquid.

The invention also relates to the apparatus associated to the claimed delivering method.

BACKGROUND

It is known to fabricate containers by blow molding, wherein a substantially tubular plastic parison commonly referred to as a "preform" is disposed in the cavity of a mold and expanded into the shape thereof by the injection of a pressurized fluid into the preform. This method lends itself well to the rapid fabrication of containers of consistently high quality.

A common variant of this process is stretch blow molding, in which a stretching rod is inserted into the preform and urged against an interior surface thereof, inducing the preform to deform along its longitudinal axis. This is particularly favored in that it enables one to exercise a greater deal of control over the longitudinal deformation of the preform, thereby enabling the production of a wider range of container shapes and sizes than by simple expansion alone.

A typical blow-molding apparatus comprises a mold, in which is provided a mold cavity in the form of the container to be produced. The preform is provided in a substantially tubular form generally resembling a test tube and which is disposed at least partially within the mold, conventionally being inserted into the mold cavity through a hole disposed in an upper surface of the mold.

In the conventional process, prior to being inserted into the mold for stretch-blow molding, the preform is heated (using radiative heating) to facilitate its deformation during the forming of the container. The hot preform is then taken off and transported into a mold of a blow molding machine. Temperature of the preform once positioned in the mold should be above the glass transition temperature (about 100° C.) so as to enable it to be formed by stretch-blow molding.

For many years, the PET bottles usually found on the market have been manufactured by the blow molding or stretch-blow molding of PET preforms using compressed air. But recently it has become known to effectuate the expansion of the preform by injecting an incompressible fluid into the cavity of the preform to induce the preform to expand. This new process is known as "simultaneous forming and filling process" of a container using the liquid injection blow molding technique. This offers a greater degree of control over the molding process, and when the injected liquid is the product to be packaged within the container, it allows combining the forming and filling steps to realize a considerable gain in process efficiency.

The use of incompressible fluid in the forming and filling process leads to reconsidering certain processes, especially for the preparation of the preform to be stretch-blow molded.

Indeed, during the preform's heating process and positioning in the mold, the preform is empty and its cavity full of air. The presence of the air generates difficulties in the subsequent incompressible fluid stretch blow molding process.

These difficulties are, for example, found during the liquid injection step.

Indeed, during the liquid injection step leading to the forming and filling of the container, the air trapped in the preform's cavity will act as spring means as it can be compressed by the liquid when the latter is injected in the preform. The air will then disrupt the expansion of the preform inside the mold and could lead to the breaking of the container while it is being formed.

It is therefore an object of the invention to provide a method of delivering a predetermined volume of liquid product into a thermoplastic container which resolves the disadvantages of the prior art as detailed above.

SUMMARY OF THE INVENTION

In this respects, the invention provides a method of delivering a predetermined volume of a liquid product, defined as the liquid end product, formed by addition of a first and second liquid product, into a thermoplastic container formed from a heated preform positioned in a mold having an opening opposite an injection head in which prior to injecting the second liquid product in the preform causing expansion of the container, the method includes a step of, at least partially, filling the preform with the first liquid product.

The proposed method makes it possible to avoid the presence of air trapped in the liquid and filled bottle.

This is also advantageous in that it allows better control of the deformation of the preform during the liquid injection step and avoids the spring effect of the air trapped in the preform.

In a preferred embodiment, the preform is filled with the first liquid prior to the step of heating the preform. By way of example, the preform is filled before it enters into the oven for heating the preform. This embodiment allows easy filling of the preform as the filling step takes place before the preform enters the oven used for heating the preforms.

In another embodiment, the preform is filled at the time the preform is being heated. For instance, the preform is filled while it is in the oven and being heated. This makes it possible to conceive a simple device to be integrated in the oven in order to fill the preforms.

According to another embodiment, the preform is filled during the transfer of the heated preform from the oven into the mold. In this specific case, the way to fill the preform with the first liquid is also very simple.

According to another embodiment, the preform is filled just before the liquid injection step takes place, while the preform is already positioned in the mold of the liquid injection blow molding apparatus. This allows to fill the preform at the last moment and to fill it when it is heated.

According to a further feature the first liquid which is introduced in the preform prior to the forming and filling process is at least a component of the liquid end product. This makes it possible to have a final beverage defined as the liquid end product, composed of two liquids, the first liquid and the second liquid product (used for expanding the preform) thereby leading to multiple options in beverage development, for example for flavored beverages or colored beverages.

More particularly, the first liquid is similar to the second liquid product. This is advantageous in that the two liquids mix together easily as they are identical (same composition, density, etc.).

According to another feature, the first liquid product is similar to the liquid end product.

According to another feature, the first liquid filled in the preform has a temperature between 10° C. and 100° C. This is advantageous in that the temperature of the first liquid product can be chosen according to the temperature of the liquid end product. More particularly, the temperature of the first liquid can be chosen to be similar to the temperature of the heated preform in which it is introduced.

In another aspect, the invention provides an apparatus for delivering a predetermined volume of a liquid end product, formed by addition of a first liquid product and second liquid product, into a thermoplastic container formed from a preform, the apparatus comprising: a heating oven configured to heat the preform; a mold having surfaces defining a cavity in a final shape of the container, the mold being configured to receive the preform in the cavity with a mouth of the preform accessible outside of the cavity; a stretch member moveable between extended and retracted positions and configured to stretch the preform in the mold, in the retracted position the stretch member being located outside of the mold; an actuator coupled to the stretch member and configured to move the stretch member between the extended and retracted positions; an injection head configured to inject the second liquid product through the mouth of the preform so as to cause expansion of the preform within the mold thereby obtaining a blown and filled container that includes a dispensing opening; and a preform filler configured to at least partially fill the preform with the first liquid before expanding of the preform in the mold cavity and prior to injecting of the second liquid product into the preform causing expansion of the container.

The invention is further described with reference to the following example. It will be appreciated that the invention as claimed is not intended to be limited in any way by this example.

BRIEF DESCRIPTION OF THE DRAWINGS

The invention is further described with reference to the following examples. It will be appreciated that the invention as claimed is not intended to be limited in any way by these examples.

Embodiments of the present invention will now be described, by way of examples, with reference to the accompanying figures in which.

DETAILED DESCRIPTION

As used in the following description, the words "comprises", "comprising", and similar words, are not to be interpreted in an exclusive or exhaustive sense. In other words, they are intended to mean including, but not limited to.

Any reference to prior art documents in this specification is not to be considered as an admission that such prior art is widely known or forms part of the common general knowledge in the field.

Figure 1:
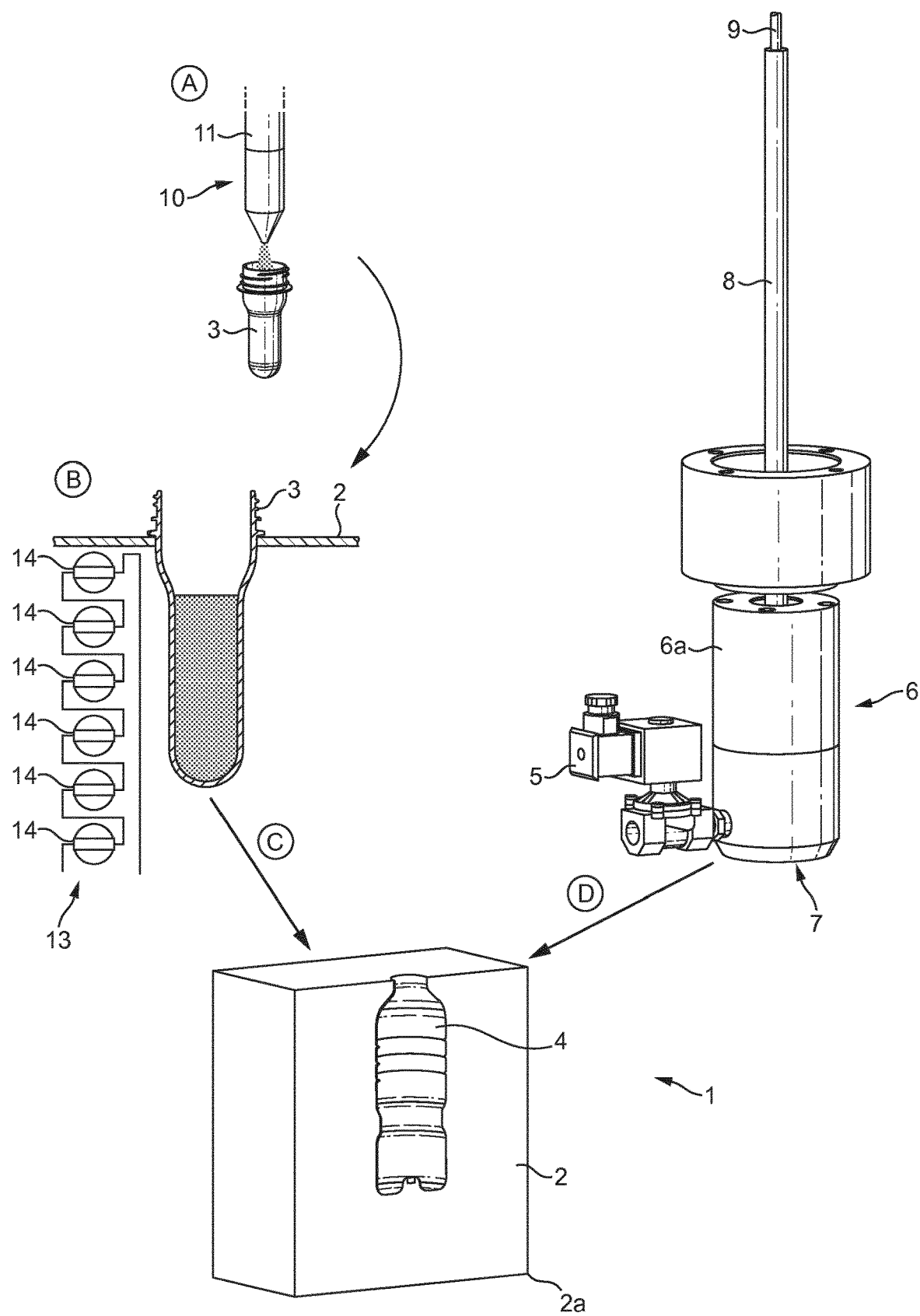
FIG. 1 is a schematic view of an apparatus for simultaneously blowing and filing containers according to a first embodiment of the invention.

FIG. 1 schematically represents an apparatus 1 in which is implemented a method for delivering a predetermined volume of a liquid product in a container that has been obtained from a preform through a simultaneous blowing and filling process, according to the present invention.

The liquid in the final container, also defined as liquid end product, is for example, water, flavored water, carbonated liquid products, etc. . . . . .

The liquid end product is formed by the addition of a first and second liquid product. The second liquid product is the liquid product to be injected into the preform during the liquid injection step of the one step forming and filling process and the first liquid product is a liquid product that, according to the invention, is introduced in the preform prior to the liquid injection step.

The preform which is used for the liquid injection blow molding of the container is first manufactured through a molding process and then heated before being positioned within a mold, as disclosed in Applicant's patent EP 1 529 620 B1.

The preform usually assumes the shape of a cylindrical tube closed at its bottom end and open at its opposite end.

The preform may be made of thermoplastic polymer, for example, polyethylene or terephthalate (PET)

As presented in FIG. 1, the apparatus 1 comprises a blowing mold 2 defining a cavity 4 for enclosing a preform 3, a liquid injection circuit 5 and injection means 6 for injecting a liquid into the preform 3 to simultaneously form and fill a container (not represented).

Mold 2 is for example a two-part mold of which the two parts or side halves define an inner cavity 4 when assembled together. For ease of representation, only a half 2a of the mold 2 is represented in FIG. 1.

When the preform 3 is to be positioned in the mold 2, firstly, the two side halves are spaced apart from each other under the action of moving means (not represented in the drawing) for inserting a preform 3 there between.

Next the two side halves are moved back toward each other so as to come into contact along a joint plane.

The preform 3 is inserted into cavity 4 before the beginning of a blowing and filling step according to the invention.

Once the preform 3 has been positioned within mold 2 only the open end of the preform is visible from above the mold 2.

The shape of the cavity corresponds to the shape of the achieved container and it will be wholly occupied by the formed container at the end of the blowing and filling method.

It is to be noted that mold 2 may alternatively be composed of more than two parts depending on the manufacturing process.

For instance, a third part (base or bottom part) may be added at the bottom of the mold so as to define at least a part of the inner cavity bottom.

The liquid injection circuit 5 (only part of it is represented) providing the liquid to the injection means 6.

The injection means 6 comprise an injection head 6a which comes into a sealing contact (for liquid tightness purpose) with mold 2 and preform 3 and inject liquid into the preform 3 through an injection nozzle 7.

Apparatus 1 also comprises stretching means 8 for stretching preform 3 when enclosed within mold 2 prior to or time-shifted with the liquid injection step.

Stretching means 8 comprise a stretch rod 9 which is in a sliding connection with the injection nozzle 7. In FIG. 1 stretch rod 9 is in a retracted position before being used.

According to the invention, prior to injecting the second liquid product in the preform, the preform is at least partially filled with a first liquid.

Therefore, the apparatus further comprises a preform filling means 10 in order to fill, at least partially, the preform with the first liquid.

The preform filling means 10 comprises a filler 11 and associated liquid filling circuits (not represented).

Filler 11 is a filler used in the bottling technology and well-known to the skilled person. It will not be described nor presented in details. Only a schematic representation is proposed.

In the present embodiment, the preform 3 is filled with the first liquid prior to being positioned in the mold.

Preferably the preform is filled before heating the preform.

In a typical blow molding process, the preform is first pre-heated, generally by use of ovens, radiant heaters or any equivalent device. The temperature to which the preform is heated is one above the vitreous transition point of the material. This renders the preform soft and pliable, and thus capable of flowing into the recesses of the mold. The working temperature of a blow molding process thus ranges from 75° C. to 135° C., depending on the properties of the material used.

In FIG. 1, the heating means 13 are using infra-red lamps 14 positioned along the length of the preform 3.

The proposed embodiment allows to heat the preform and first liquid at the same time and to homogenize the temperature of the whole.

Hence, the process presents the following steps:

Step A: The preform 3 is filled with the first liquid;

Step B: The preform 3 filled with the first liquid is heated in order to have the polymer approaching its vitreous temperature;

Step C: The preform 3 filled with the first liquid is transferred into the cavity 4 of mold 2; and Step D: The liquid injection step takes place and the preform 3 is blow molded using the second liquid product.

Therefore, during step D, the second liquid product used as injection fluid mixes with the first liquid initially in the preform.

In order to have an effective mixing of the second liquid product with the first liquid, the first liquid is preferably similar to the second liquid product. In this case, the mixing is complete. For example, the second liquid product and the first liquid are both water.

According to another feature, the first liquid is at least a component of the liquid end product. For example the first liquid could be a flavor concentrate, the second liquid product, water and the resulting liquid end product is flavored water.

In addition to the previous characteristics, the first liquid has anti-oxidation properties to contribute to avoid oxidation of the liquid end product.

Furthermore, according to the process which is implemented, it is interesting to choose the temperature of the first liquid so as to avoid disrupting the process by, for example, cooling down the preform whereas it should be kept at a temperature around the vitreous temperature of the polymer material.

Hence, the temperature of the first liquid filled in the preform can be chosen to have a temperature between 10° C. and 100° C.

Concerning the timing of filling the preform with the first liquid, several alternatives can be considered according to the production line of the filled container.

According to another embodiment of the present invention (not represented), the preform is filled at the time the preform is being heated. Therefore step A and B (previously defined) are processed at the same time. It allows saving time in the process especially if the first liquid it at a temperature similar to the vitreous temperature of the preform's material.

According to a further embodiment of the present invention (not represented), the preform is filled during the transfer of the heated preform in the mold: Step B takes place before step A and step A and C are processed at the same time.

According to a further embodiment of the present invention (not represented), the preform is filled just before the liquid injection step takes place.

Pumps, valve devices and control means used during the liquid injection blow molding process aiming at simultaneous forming and filling the container are not represented and not detailed but are part of the skilled person knowledge.

Once the container is formed, the mold is opened by moving the two mold side halves away from each other so as to release container from the mold.

Before the opening of the mold, the container is capped by a capping head (not represented). The capping head can be directly integrated in the injection blow molding apparatus.

Alternatively, the container can be capped after the release of the container from the mold.

Figure 2:
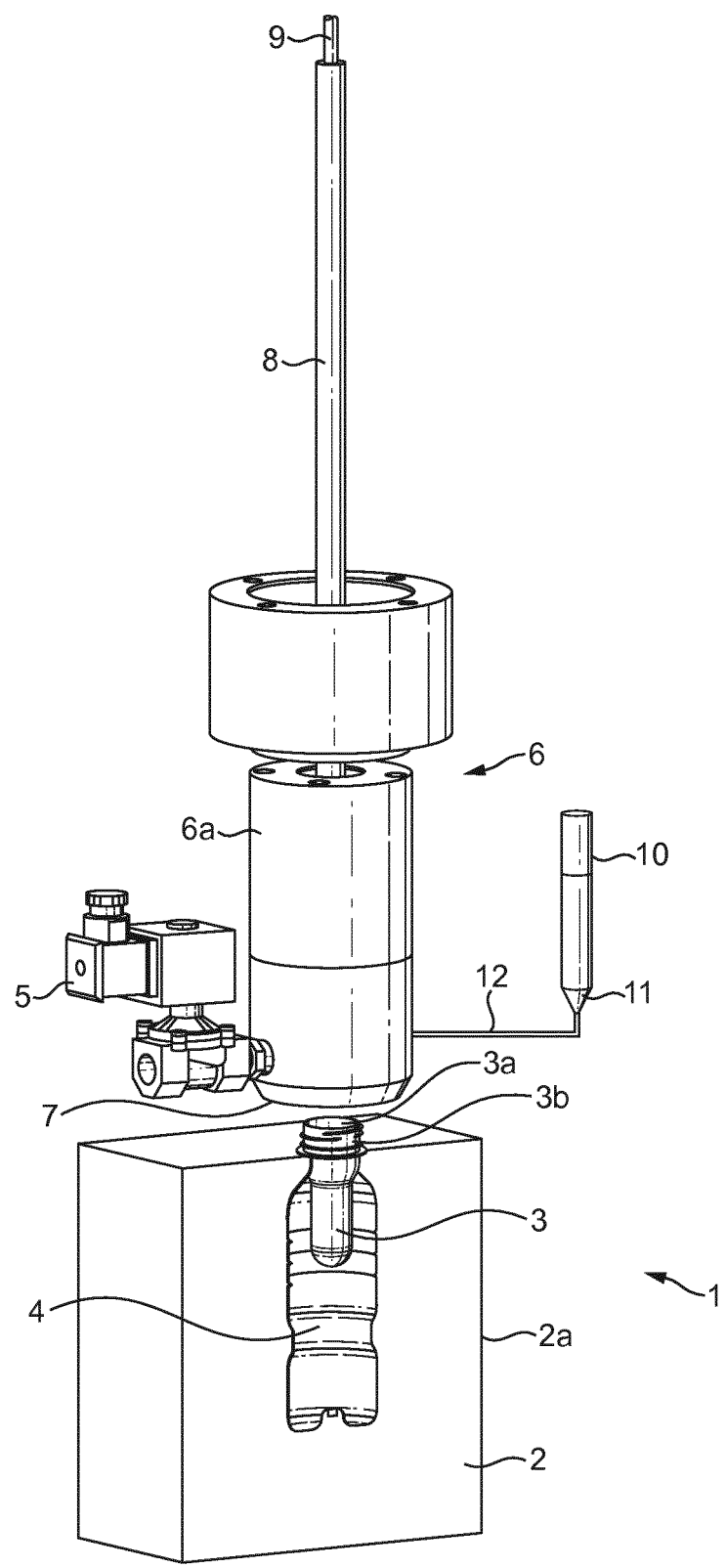
FIG. 2 a schematic view of an apparatus for simultaneously blowing and filing containers according to a second embodiment of the invention.

FIG. 2 schematically represents an apparatus 1 in which is implemented a method for delivering a predetermined volume of a liquid end product in a container that has been obtained from a preform through a simultaneous blowing and filling process in which the preform is filled with the first liquid while the preform is disposed in the mold, according to a second embodiment of the present invention.

The apparatus of FIG. 2 is similar to the one of FIG. 1 with the same references and same operating process, except in that the preform is filled just before the liquid injection step takes place while the heated preform 3 is disposed in the mold 2.

FIG. 2 shows the preform 3 positioned in the mold 2 with the neck 3b of the preform lying on the upper face of the mold 2.

In this second embodiment the preform's filling means 10 is integrated to the device comprising the injections means 6.

The preform's filling means 10 comprises a filler 11 and a liquid filling circuit 12 in order to bring the first liquid stored in the filler 11 to the preform 3.

The liquid filling circuit 12 is positioned near to the injection nozzle 7 or can be integrated into the injection nozzle 7.

Integration of the liquid filling circuit 12 into the injection nozzle 7 leads to a reduced sized device.

In this embodiment, the preform 3 is conventionally heated and positioned in the mold 2 (similar to the one of the first embodiment). According to the invention the preform 3 is then filled with the first liquid prior to the liquid injection step in which the second liquid is injected in the preform to expand it in the mold's cavity 4 to form the final container.

As mentioned in the context of the first embodiment, the first liquid can be heated (between 10° C. and 100° C.) according to the working process.

The first liquid has the same characteristics as the ones presented in the context of the embodiment of FIG. 1.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

We claim:

1. An apparatus for delivering a predetermined volume of a liquid end product, formed by addition of a first liquid product and second liquid product, into a thermoplastic container formed from a preform, the apparatus comprising:
   a heating oven configured to heat the preform;
   a mold having surfaces defining a cavity in a final shape of the container, the mold being configured to receive the preform in the cavity with a mouth of the preform accessible outside of the cavity;
   a stretch member moveable between extended and retracted positions and configured to stretch the preform in the mold, in the retracted position the stretch member being located outside of the mold;
   an actuator coupled to the stretch member and configured to move the stretch member between the extended and retracted positions;
   an injection head configured to inject the second liquid product through the mouth of the preform so as to cause expansion of the preform within the mold thereby obtaining a blown and filled container that includes a dispensing opening; and
   a preform filler configured to at least partially fill the preform with the first liquid before expanding of the preform in the mold cavity and prior to injecting of the second liquid product into the preform causing expansion of the container.

2. An apparatus for delivering a predetermined volume of a liquid end product, formed by addition of a first liquid product and second liquid product, into a thermoplastic container formed from a preform, the apparatus comprising:
   a heating oven configured to heat the preform;
   a mold having surfaces defining a cavity in a final shape of the container, the mold being configured to receive the preform in the cavity with a mouth of the preform accessible outside of the cavity;
   a stretch member moveable between extended and retracted positions and configured to stretch the preform in the mold, in the retracted position the stretch member being located outside of the mold;
   an actuator coupled to the stretch member and configured to move the stretch member between the extended and retracted positions;
   an injection head configured to inject the second liquid product through the mouth of the preform so as to cause expansion of the preform within the mold thereby obtaining a blown and filled container that includes a dispensing opening; and
   a preform filler configured to at least partially fill the preform with the first liquid before expanding of the preform in the mold cavity and prior to injecting of the second liquid product into the preform causing expansion of the container, the preform filler being located upstream of the mold and configured to at least partially fill the preform before the preform is received in the mold.

3. The apparatus according to claim 2, wherein the preform filler is located adjacent the heating oven and configured to at least partially fill the preform before the preform is received in the heating oven.

4. The apparatus according to claim 2, wherein the preform filler is located upstream of the heating oven and configured to at least partially fill the preform before the preform is received in the heating oven.

5. The apparatus according to claim 1, wherein the preform filler includes a first liquid filling circuit.

6. The apparatus according to claim 1, wherein the preform filler is integrated with the injection head.

7. The apparatus according to claim 1, wherein the preform filler is configured to provide a heated first liquid.

8. The apparatus according to claim 1, wherein the first liquid is water.

9. The apparatus according to claim 1, wherein the heating oven includes infrared heaters.

10. The apparatus according to claim 1, wherein the mold includes mold halves moveable between open and closed positions.

11. The apparatus according to claim 1, further comprising a liquid injection circuit coupled to the injection head.

12. The apparatus according to claim 1, wherein the liquid injection circuit is configured to provide the second liquid product to the injection head.

13. The apparatus according to claim 1, wherein the second liquid product is water.

14. The apparatus according to claim 1, wherein the first liquid product is water and the second liquid product is water.

15. The apparatus according to claim 1, wherein the first liquid product and the second liquid product are components of the liquid end product.

16. The apparatus according to claim 1, wherein the first liquid product is a component of the liquid end product.

17. The apparatus according to claim 1, wherein the heating oven is configured to heat the preform to a temperature between 10° C. and 100° C.

18. The apparatus according to claim 1, wherein the heating oven is configured to heat the first liquid product and the preform to a temperature between 10° C. and 100° C.

19. An apparatus for delivering a predetermined volume of a liquid end product, formed by addition of a first liquid product and second liquid product, into a thermoplastic container formed from a preform, the apparatus comprising:
   a heating oven configured to heat the preform;
   a mold having surfaces defining a cavity in a final shape of the container, the mold being configured to receive the preform in the cavity with a mouth of the preform accessible outside of the cavity;
   a stretch member moveable between extended and retracted positions and configured to stretch the preform in the mold, in the retracted position the stretch member being located outside of the mold;
   an actuator coupled to the stretch member and configured to move the stretch member between the extended and retracted positions;
   an injection head configured to inject the second liquid product through the mouth of the preform so as to cause expansion of the preform within the mold thereby obtaining a blown and filled container that includes a dispensing opening; and a preform filler configured to at least partially fill the preform with the first liquid before expanding of the preform in the mold cavity and prior to injecting of the second liquid product into the preform causing expansion of the container, the preform filler being configured to provide the first liquid product at a temperature between 10° C. and 100° C.

* * * * *